United States Patent [19]

Brown

[11] 3,771,990
[45] Nov. 13, 1973

[54] CONTROLLING AQUEOUS MICROORGANISMS WITH N-POLYHALOVINYLTHIO CARBOXAMIDES

[75] Inventor: Melancthon S. Brown, Berkeley, Calif.

[73] Assignee: Chevron Research Company, San Francisco, Calif.

[22] Filed: May 15, 1972

[21] Appl. No.: 253,642

Related U.S. Application Data

[60] Division of Ser. No. 33,879, April 30, 1970, Pat. No. 3,679,673, which is a continuation-in-part of Ser. Nos. 810,368, March 25, 1969, abandoned, and Ser. No. 748,642, June 30, 1968, abandoned, said Ser. No. 810,368, Continuation-in-part of Ser. No. 748,642, and Ser. No. 704,555, said Ser. No. 748,642, Continuation-in-part of Ser. No. 810,377.

[52] U.S. Cl.............................. 71/66, 71/67, 71/88, 71/95
[51] Int. Cl............................................... A01n 9/12
[58] Field of Search ..................... 71/66, 67, 98, 88, 71/94, 95; 162/161; 210/64

[56] References Cited
UNITED STATES PATENTS 3,629,419  12/1971  Moon....................................... 71/67
3,344,153  9/1967  Kuhle et al....................... 260/453 R
3,178,447  4/1965  Kohn................................... 424/273

Primary Examiner—Glennon H. Hollrah
Attorney—J. A. Buchanan, Jr. et al.

[57] ABSTRACT

N-polyhalovinylthiocarboxamides of the formula:

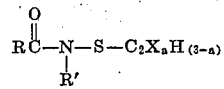

where R is an aliphatic hydrocarbon radical of one to 10 carbon atoms which has 0 to about 3 halogen substituents of atomic number 17 to 35, R' is hydrogen or alkyl of one to four carbon atoms with the proviso that R and R' may be joined to form a linear alkylene radical of three to five carbon atoms which is bound to the carbonyl and nitrogen to form a ring, X is halogen of atomic number 17 to 35 and $a$ is 2 or 3. These carboxamides are fungicidal, algicidal and nematocidal.

7 Claims, No Drawings

CONTROLLING AQUEOUS MICROORGANISMS WITH N-POLYHALOVINYLTHIO CARBOXAMIDES

CROSS REFERENCE TO RELATED APPLICATIONS

This application is a division of application Ser. No. 33,879, filed Apr. 30, 1970, now U.S. Pat. No. 3,679,673, which application is a continuation-in-part of application Ser. No. 810,368, filed Mar. 25, 1969, now abandoned and application Ser. No. 748,642, filed June 30, 1968, now abandoned. Application Ser. No. 810,368 is a continuation-in-part of application Ser. No. 748,642 and application Ser. No. 704,555, filed Feb. 12, 1968, now abandoned. Application Ser. No. 748,642 is a continuation-in-part of application Ser. No. 704,555. Related application Ser. No. 810,377 was filed Mar. 25, 1969 now abandoned.

FIELD OF INVENTION

This invention concerns N-polyhalovinylthiocarboxamides and their use as pesticides, especially as nematocides.

INVENTION DESCRIPTION

The novel carboxamides of the present invention may be represented by the formula

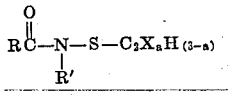

wherein R is an aliphatic hydrocarbon radical of one to 10 carbon atoms which has 0 to 3 halogen substituents of atomic number 17 to 35, i.e., R is alkyl of one to 10 carbon atoms, alkenyl of two to 10 carbon atoms, alkynyl of two to 10 carbon atoms, haloalkyl of one to 10 carbon atoms and one to three halogen atoms of atomic number 17 to 35, cycloalkyl of three to 10 carbon atoms, cycloalkyl of three to 10 carbon atoms, preferably cyclohexyl, substituted with one to three halogen atoms of atomic number 17 to 35, or cycloalkenyl of three to 10 carbon atoms; R' is hydrogen or alkyl of one to four carbon atoms with the proviso that R and R' may be joined to form a linear alkylene radical of three to five carbon atoms which is bound to the carbonyl and nitrogen to form a ring; X is halogen of atomic number 17 to 35; and $a$ is 2 or 3.

Preferably X is chlorine; $a$ is 3; R is an aliphatic hydrocarbon radical of one to eight carbon atoms which is free of aliphatic unsaturation and has 0 to 3 halogen substituents, more preferably 0 to 2 chloro substituents, i.e., R is alkyl of one to eight carbon atoms, haloalkyl of one to eight carbon atoms and one to three halogen atoms of atomic number 17 to 35, more preferably one to two chlorine atoms, cycloalkyl of three to eight carbon atoms, or cycloalkyl of three to eight carbon atoms substituted with one to three halogen atoms of atomic number 17 to 35, more preferably one to two chlorine atoms; and R' is hydrogen or alkyl of one to two carbon atoms.

The carboxamides in which R and R' are joined to form a ring with the carbonyl and nitrogen may alternatively be represented by the formula (1) 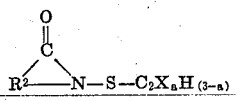

wherein $R^2$ is linear alkylene of three to five carbon atoms and X and $a$ are as defined previously.

Representative polyhalovinyl groups which $—C_2X_aH_{(3-a)}$ may represent are trichlorovinyl, 1,2-dichlorovinyl, 2,2-dichlorovinyl, tribromovinyl, 2,2-dibromovinyl, 1,2-dibromovinyl, 2-bromo-2-chlorovinyl and the like.

Organic groups which R in formula (1) above may represent are alkyl, alkenyl, alkynyl, cycloalkyl and cycloalkenyl. Specific examples of such groups are methyl, ethyl, isopropyl, n-butyl, properyl, propynyl, sec.butyl, amyl, hexyl, octyl, decyl, 3-methylamyl, cyclobutyl, cyclohexyl, cyclooctyl and the like. Halosubstituted radicals which R may represent include chloroalkyl, bromoalkyl, chlorocycloalkyl and bromocycloalkyl. Specific examples of such halosubstituted radicals are chloromethyl, 2-chloroethyl, 3-chloropropyl, 4-chloroamyl, 6-chlorohexyl, p-chlorocyclohexyl, 2,6-dichlorocyclohexyl, 2,6-dibromocyclohexyl and p-bromocyclohexyl.

Alkyl radicals which R' may represent include methyl, ethyl, n-propyl, isopropyl, n-butyl and isobutyl. Alkylene radicals which R and R' taken together or $R^2$ may represent are propylene, butylene and amylene.

Typical carboxamides represented by the above formulas and N-trichlorovinylthioacetamide, N-tribromovinylthioacetamide, N-1,2-dichlorovinylthioacetamine, N-2-bromo-2-chlorovinylthioacetamide, N-methyl-N-1,2-dibromovinylthioacetamine, N-ethyl-N-trichlorovinylthioacetamide, N-isobutyl-N-2-bromo-2-chlorovinylthioacetamide, N-tribromovinylthiochloroacetamide, N-ethyl-N-1-chloro-2-bromovinylthiobromoacetamide, N-1,2-dibromovinylthiopropionamide, N-2,2-dichlorovinylthiopropionamide, N-2-bromo-2-chlorovinylthiopropionamide, N-methyl-N-trichlorovinylthiopropionamide, N-isopropyl-N-1-chloro-2-bromovinylthiopropionamide, N-n-butyl-N-1,2-dichlorovinylthiopropionamide, N-trichlorovinylthio-3,3-dichloropropionamide, N-methyl-N-2,2-dichlorovinylthio-2,3-dibromopropionamide, N-butyl-N-1-chloro-2-bromovinylthiochloropropionamide, N-1,2-dichlorovinylthiobutyramide, N-1-chloro-2-bromovinylthiobutyramide, N-propyl-N-1,2-dibromovinylthiobutyramide, N-methyl-N-2-bromo-2-chlorovinylthiopentamide, N-trichlorovinylthio-3,4,5-trichloropentanamide, N-butyl-N-tribromovinylthiohexanamide, N-2-bromo-2-chlorovinylthio-5-bromohexamide, N-ethyl-N-trichlorovinylthioheptanamide, N-2,2-dichlorovinylthio-6,7-dichloroheptanamide, N-trichlorovinylthiooctanamide, N-propyl-N-2,2-dichlorovinylthio-3,5,7-tribromooctanamide, N-trichlorovinylthiodecanamide, N-methyl-N-1,2-dibromovinylthio-10-chlorodecanamide, N-butyl-N-trichlorovinylthioundecanamide, N-1-chloro-2-bromovinylthioundecanamide, N-trichlorovinylthioacrylamide, N-methyl-N-trichlorovinylthio-3-chloroacrylamide, N-butyl-N-trichlorovinylthiocrotonamide, N-2,2-dichlorovinylthio-2-ethylacrylamide, N-trichlorovinylthio-3-hexenamide, N-trichlorovinylthio-3-decenamide, N-trichlorovinylthiopropiolamide, N- trichlorovinylthio-3-butynamide, N-trichlorovinylthiocyclooctanecarboxamide, N-propyl-N-tribromovinylthio-3,4-dichlorocyclohexanecarboxamide, N-trichlorovinylthio-4-bromocyclohexanecarboxamide, N-methyl-N-1-chloro-2-bromovinylthio-2-chlorocyclobutanecarboxamide, N-trichlorovinylthiocyclohexenecarboxamide, N-butyl-N-2-bromo-2-chlorovinylthiocyclohexenecarboxamide, N-trichlorovinylthiopyrrolidone, N-tribromovinylthiopyrrolidone, N-1-chloro-2-bromovinylthiopyrrolidone, N-trichlorovinylthiopiperidone, N-1,2-dibromovinylthiopiperidone, N-2-bromo-2-chlorovinylthiopiperidone, N-trichlorovinylthiocaprolactam, N-2,2-dichlorovinylthiocaprolactam and N-1-chloro-2-bromovinylthiocaprolactam.

The carboxamides of this invention may be prepared by reacting a sulfenyl halide with a primary or secondary carboxamide or a lactam. This reaction is illustrated by the following chemical equation:

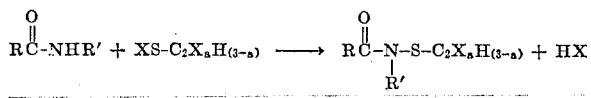

where R, R', X and $a$ are as previously defined. It is desirable to carry out this reaction in the presence of inert solvents such as dimethylsulfoxide, dimethylformamide, acetonitrile, dioxane and the like. The reaction temperature is, in general, not critical and will usually be in the range of about $-20$ to about $50°C$., preferably about $0°$ to $20°C$. Likewise, the pressure is not critical and will usually be atmospheric or autogenous. It is desirable to use stoichiometric proportions of the reactants or a slight excess of the sulfenyl halide reactant.

In reactions wherein R' is an organic group, it is necessary to have a mild, basic halogen halide acceptor present. At least stoichiometric amounts of acceptor should be used. Soluble tertiary amines such as pyridine and trialkylamines, e.g., triethylamine and tripropylamine are preferred. Acceptors which are strong enough to react with the sulfenyl halide reactant should be avoided.

Carboxamides of this invention may also be prepared by dehydrohalogenating corresponding N-polyhaloalkylthiocarboxamides. For instance, N-(tetrachloroethylthio) carboxamides may be dehydrochlorinated to produce N-trichlorovinylthiocarboxamides. This dehydrohalogenation will normally be carried out at low temperatures, usually about $0°$ to $40°C$.

and in the presence of solvents such as benzene, toluene, ether, methylene chloride, acetonitrile and chloroform. Mild dehydrohalogenating agents such as tertiary amines (trialkyl amines, pyridine, etc.) or alkali metal carbonates will normally be employed. Triethylamine is a preferred agent.

EXAMPLES

The following examples describe methods which may be used to prepare the carboxamides of this invention. These examples are not intended to limit the invention described herein. Percentages are by weight.

EXAMPLE 1

15 g. of acetamide and 100 ml. dimethylformamide were placed in a vessel cooled in an ice bath. 20 g. of freshly distilled trichlorovinylsulfenyl chloride was added slowly to this mixture. After this addition, the vessel was removed from the ice bath and allowed to stand for 1 hour at ambient temperature. 1 liter of ice water was then added to the vessel causing a precipitate to form. The vessel's contents were then filtered and washed with water and hexane. The solid was then dissolved in methylene chloride and the solution was dried over $MgSO_4$. After drying, the methylene chloride was stripped off leaving 11 g. of N-trichlorovinylthioacetamide. This compound, a white solid, melted at $79°-82°C$. Its S and Cl analyses were:

|   |   | Calculated | Found |
|---|---|---|---|
| S | % | 14.5 | 14.68 |
| Cl | % | 48.3 | 47.90 |

EXAMPLE 2

A solution of 4 g. of triethylamine in 20 ml. of benzene were added dropwise to a solution of 10 g. of N-1,1,2,2-tetrachloroethylthiochloroacetamide in 100 ml. of benzene. The reaction mixture was then refluxed for 2 hours and then cooled and filtered. The filtrate was washed twice with saturated sodium chloride solution, dried over magnesium sulfate, filtered and stripped. N-trichlorovinylthiochloroacetamide was recrystallized from hexane. Chemical analyses showed the following:

|   |   | Calculated | Found |
|---|---|---|---|
| S | % | 12.55 | 12.52 |
| Cl | % | 55.6 | 53.3 |

The melting point of the compound was $85°-95°C$.

Other carboxamides of this invention were prepared by the method described in Example 1. These carboxamides are listed in Table I.

TABLE I

| Compound | Element analyses, percent | | | | Melting point, °C. |
|---|---|---|---|---|---|
|  | S | | Cl | | |
|  | Calculated | Found | Calculated | Found | |
| N-trichlorovinylthiochloroacetamide | 12.55 | 12.52 | 55.6 | 53.3 | 85–90 |
| N-trichlorovinylthiopropionamide | 13.65 | 13.62 | 45.4 | 45.60 | 80–83 |
| N-trichlorovinylthiocyclohexanecarboxamide | 11.06 | 11.23 | 36.8 | 36.55 | 146–149 |
| N-trichlorovinylthio-n-butyramide | 12.87 | 12.92 | 42.8 | 42.30 | 65–68 |
| N-trichlorovinylthio-n-hexanamide | 11.57 | 11.88 | 38.42 | 38.52 | 46–50 |
| N-trichlorovinylthioisobutyramide | 11.8 | 12.37 | 39.3 | 41.94 | 95–100 |
| N-trichlorovinylthiotrimethylacetamide | 12.15 | 12.22 | 40.45 | 39.85 | 125–128 |
| N-trichlorovinylthiocyclopropanecarboxamide | 12.97 | 13.12 | 43.1 | 42.70 | 88–91 |
| N-methyl-N-trichlorovinylthioacetamide | 13.62 | 13.28 | 45.3 | 44.6 | Oil |
| N-methyl-N-trichlorovinylthiobutyramide | 12.18 | 12.38 | 40.5 | 40.5 | Oil |
| N-trichlorovinylthiopyrrolidone | 12.96 | 13.10 | 43.1 | 41.9 | Oil |
| N-trichlorovinylthiocaprolactam | 11.64 | 11.68 | 38.7 | 38.65 | Oil |
| N-2,2-dichlorovinylthiopropionamide | 16.00 | 15.72 | 35.45 | 35.18 | 83–85 |
| N-2,2-dichlorovinylthiotrimethylacetamide | 14.01 | 13.98 | 31.09 | 30.90 | 96–98 |
| N-2,2-dichlorovinylthiopyrrolidone | 15.10 | 14.68 | 33.50 | 32.70 | 97–102 |

UTILITY

The N-polyhalovinylthiocarboxamides of this invention have exhibited biological activity against a variety of organisms, particularly fungi, algae and nematodes. Their activities against nematodes were unexpectedly better than those of the most closely related known carboxamides, the N-polyhaloalkylthiocarboxamides. Also, many of them were significantly better fungicides and algicides than the known carboxamides.

The nematocidal activities of the carboxamides of this invention and their superiority over corresponding N-polyhaloalkylthio compounds were illustrated by testing representative amides of this invention and representative N-polyhaloalkylthio compounds by the following method.

A 0.38 ml. portion of a 3 percent acetone solution of the test compound was diluted with 1 ml. acetone. The resulting solution was homogenously mixed with 20 cc. of vermiculite. The treated vermiculite was then mixed homogenously with 750 g. of soil, dry weight basis, which was severely infested with free-living nematodes (mixed culture of Meloidogyne javanica and Meloidogyne incognita). This mixing gave a concentration of approximately 15 parts of the test compound per million parts of soil. This treated soil was stored for 4 days at 65°–75°F. It was then divided equally into 3 parts, each of which was put into a separate pot and kept for another 3 days. A 3-week old tomato (v. Bonny Best) seedling was then transplanted into each pot and incubated for 13 days under greenhouse conditions. After this period they were removed and the soil was washed from their roots. The nematocidal effectiveness of the test compound was determined by observing each plant for signs of nematode invasion (number of galls formed, stunting, etc.).

The results of these tests, reported as the average of the 3 replicates on a 0 to 100 basis — 0 indicating no effectiveness; 100 indicating complete effectiveness — are reported in Table II.

TABLE II

| Carboxamide moiety | Nematocidal activity. percent. N-substituent | | |
|---|---|---|---|
| | Trichlorovinylthio | Trichloromethylthio | 1.1.2.2-tetrachloroethylthio |
| $H_3C-\overset{O}{\underset{\|}{C}}-NH-$ | 100 | | 42 |
| $H_2ClC-\overset{O}{\underset{\|}{C}}-NH-$ | 96 | 15 | 0 |
| $H_3C(CH_2)_2-\overset{O}{\underset{\|}{C}}-NH-$ | 99 | | |
| $H_3C(CH_2)_4-\overset{O}{\underset{\|}{C}}-NH-$ | 83 | | |
| $H_3C_2-\overset{O}{\underset{\|}{C}}-NH-$ | 100 | | 17 |
| $H_3C-\overset{O}{\underset{\|}{C}}-N(CH_3)-$ | 81 | | |
|  | 56 | | |
|  | 100 | | |

As illustrated above, the carboxamides of this invention may be used to control plant-parasitic nematodes by exposing them to a toxic amount of the carboxamide. Thus, these carboxamides will normally be applied to nematode-infested soil at dosages in the range of 3 to 40 lbs. per acre. They may be applied as liquid formulations by spraying or injection. The liquid formulations of these carboxamides may be solutions, dispersions, or emulsions. Typical solvents which may be used are aromatics such as xylene, toluene and benzene, ketones such as cyclohexanone and the like. These liquid formulations will usually contain a wetting agent to facilitate the carboxamide's penetration into the soil and generally enhance its effectiveness. They may also be applied as solid formulations containing carriers such as soil, sawdust, clay and the like. When used as a solid, these carboxamides will usually be plowed into the soil. Following their application to the soil, the soil will be watered to disperse the carboxamide below ground level.

Carboxamides of this invention are particularly useful for controlling microbiological organisms such as algae, bacteria, molds and occasionally aquatic weeds which foul aqueous industrial effluents and cooling streams, such as those occurring in the paper and food processing industries. They may also be used to control such organisms in other aqueous bodies such as lakes, streams, canals, pools and the like. When so used, a biocidal quantity of one or more of the carboxamides of this invention is added to the aqueous growth environment of the organisms. Usually, this dosage will range between about 0.1 and 50 ppm. In any given instance, the optimum dosage will depend upon the particular organism and aqueous body involved. For instance, when used to control algae, these carboxamides will usually be employed at concentrations of about 0.1 to 10 ppm. In terms of pounds of carboxamide per acre of water one foot deep 0.1 to 10 ppm is equal to about 0.3 to 30 lbs. per acre of water one foot deep. These carboxamides may be applied to the aqueous growth environments of such organisms as dispersible powders or in solution with water-miscible solvents.

Representative carboxamides of this invention were tested as algicides by the following method.

An acetone solution of equal parts of carboxamide and a surfactant was prepared. This solution was mixed with a nutrient broth in a quantity sufficient to give a concentration of 2 ppm. carboxamide. Four replicate 150 ml. specimen cups were filled with this mixture. 350–400 mg. of Euglena was added to each specimen cup and the cups were then placed in an environment chamber for incubation. The cups were observed periodically for algae growth. The algicidal effectiveness of the carboxamide was determined based on a final observation of algae growth after 10 days.

The results of these tests, reported as the average of the 4 replicates on a 0 to 100 basis — 0 indicating no effectiveness; 100 indicating complete effectiveness — are reported in Table III.

TABLE III

| Compound | Algicidal effectiveness |
|---|---|
| N-trichlorovinylthiochloroacetamide | 100 |
| N-trichlorovinylthioacetamide | 100 |
| N-trichlorovinylthiopropionamide | 100 |
| N-trichlorovinylthiocyclohexanecarboxamide | 80 |
| N-trichlorovinylthiobutyramide | 100 |
| N-trichlorovinylthioisobutyramide | 96 |
| N-trichlorovinylthiotrimethylacetamide | 100 |
| N-trichlorovinylthiocyclopropanecarboxamide | 100 |
| N-methyl-N-trichlorovinylthioacetamide | 100 |
| N-trichlorovinylthiopyrrolidone | 100 |
| N-trichlorovinylthiocaprolactam | 100 |
| N-methyl-N-trichlorovinylbutyramide | 100 |
| N-2.2-dichlorovinylthiotrimethylacetamide | 94 |
| N-2.2-dichlorovinylthiopyrrolidone | 90 |

Comparative algicidal testing indicated the carboxamides of this invention were more effective than corresponding N-polyhaloalkylthiocarboxamides.

Carboxamides of this invention were also used to control fungi such as Pythium ultimum, Rhizoctonia solani, Fusarium oxysporum, f. phaseoli, Helminthosporium sativum, Verticillium albo-atrum, Monilinia fructicola and Alternaria solani and bacteria such as Erwinia caratovara and Pseudomonas syringae. When used as fungicides or bactericides, the carboxamides of this invention will be formulated and applied in fungicidal or bactericidal, as the case may be, amounts by conventional art methods to fungi bacteria or hosts which are subject to fungus or bacteria attack, especially vegetative hosts such as plants, plant seeds, paper and the like. They may be combined with inert liquids and solid carriers as powders, solutions or dispersions for such use.

Pesticidal formulations of the carboxamides of this invention may also contain stabilizers, spreading agents, sticking agents, fillers, other compatible pesticides and the like As will be evident to those skilled in the art, various modifications on this invention can be made or followed, in the light of the foregoing disclosure and discussion, without departing from the spirit or scope of the disclosure or from the scope of the following claims.

I claim:

1. A method for controlling the growth or organisms which foul aqueous bodies which comprises adding to said aqueous body a biocidal amount of the compound of the formula

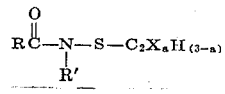

wherein R is a lower alkyl radical which has zero to three chlorine substituents or cycloalkyl of three to eight carbon atoms, R' is hydrogen or lower alkyl with the proviso that R and R' may be joined to form a linear alkylene radical of three to five carbon atoms which is bound to the carbonyl and nitrogen to form a ring, X is chlorine and $a$ is 2 or 3.

2. The method of claim 1 wherein X is chlorine and $a$ is 3.

3. The method of claim 1 wherein R is lower alkyl and has 0 to 3 chloro substituents.

4. The method of claim 1 wherein R is lower alkyl.

5. The method of claim 1 wherein X is chlorine, $a$ is 3, R is methyl and R' is hydrogen.

6. The method of claim 1 wherein X is chlorine, $a$ is 3, R and R' are joined to form a linear propylene or amylene radical which is bound to the carbonyl and nitrogen to form a ring.

7. The method of claim 1 wherein the compound is applied at a concentration in the range of about 0.1 to 50 ppm.

* * * * *